United States Patent
Singh et al.

(10) Patent No.: US 8,351,939 B1
(45) Date of Patent: Jan. 8, 2013

(54) PSEUDO NETWORK SIGNAL FOR A WIRELESS COMMUNICATION DEVICE

(75) Inventors: Jasinder Pal Singh, Olathe, KS (US); Jason Peter Sigg, Overland Park, KS (US); Ashish Bhan, Shawnee, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 28 days.

(21) Appl. No.: 13/154,648

(22) Filed: Jun. 7, 2011

(51) Int. Cl.
*H04W 4/00* (2009.01)

(52) U.S. Cl. ............... 455/435.1; 455/435.2; 455/432.1; 455/433; 455/411; 455/414.1; 455/414.2; 455/439; 455/436; 370/278; 370/281; 370/328; 370/338; 370/339

(58) Field of Classification Search ............... 455/435.1, 455/435.2, 432.1, 433, 524, 411, 414.1, 414.2, 455/439, 436, 450, 185.1, 186.1; 370/278, 370/281, 339, 338, 328
See application file for complete search history.

(56) References Cited

U.S. PATENT DOCUMENTS

| | | | |
|---|---|---|---|
| 6,564,055 B1 | 5/2003 | Hronek | |
| 6,625,451 B1 | 9/2003 | La Medica et al. | |
| 7,260,394 B2 | 8/2007 | Welnick et al. | |
| 7,349,695 B2 | 3/2008 | Oommen et al. | |
| 7,593,365 B1 | 9/2009 | Delker et al. | |
| 7,593,730 B2 | 9/2009 | Khandelwal et al. | |
| 7,603,119 B1 | 10/2009 | Durig et al. | |
| 7,826,844 B2 * | 11/2010 | Cooper | 455/435.3 |
| 2004/0203780 A1 * | 10/2004 | Julka et al. | 455/436 |
| 2005/0227688 A1 | 10/2005 | Li et al. | |
| 2006/0252426 A1 | 11/2006 | Hossain et al. | |

* cited by examiner

*Primary Examiner* — Ajit Patel
*Assistant Examiner* — Khai M Nguyen

(57) ABSTRACT

A wireless communication device comprises a processing system and a wireless communication transceiver. The processing system is configured to store in a memory system data that associates a geographic identifier, a pseudo network signal of a first wireless communication network, and a wireless communication channel of a second wireless communication network. The wireless communication transceiver is configured to wirelessly exchange first wireless communications with the first wireless communication network. The processing system is configured to, in response to the wireless communication device entering a geographic region associated with the geographic identifier, process the geographic identifier to identify the pseudo network signal of the first wireless communication network and the wireless communication channel of the second wireless communication network. The wireless communication transceiver is configured to wirelessly receive the pseudo network signal from the first wireless communication network, and in response, wirelessly exchange second wireless communications with the second wireless communication network over the wireless communication channel.

20 Claims, 7 Drawing Sheets

| GEO | SID/NID | PROVIDER | FREQUENCY |
|---|---|---|---|
| REGION 330 | 4139/21 | COMM NET 310 | 1900 MHz |
| REGION 330 | 4139/22 | COMM NET 310 | 1900 MHz |
| REGION 330 | 99999/65535 | COMM NET 310 | 800 MHz |

PREFERRED ROAMING LIST 400

FIGURE 4

PSEUDO NETWORK SIGNAL FOR A WIRELESS COMMUNICATION DEVICE

TECHNICAL BACKGROUND

A wireless communication device is commonly associated with a particular wireless network, often referred to as a home wireless network. For example, a user who subscribes for a communication service from a wireless network operator may access the service using a wireless communication device homed to the wireless network operator's network. Typically, a wireless network operator does not have proprietary ownership of wireless coverage across all geographic regions where service is offered. Instead, most wireless network operators allow their associated users to access wireless communication services from partnering, visited wireless networks. This practice, termed roaming, enables users to receive wireless communication services in the largest possible geographic area. However, when a user associated with one wireless network operator roams in a visited wireless network, the wireless network operator must often pay predetermined fees to the visited wireless network operator.

Presently, a wireless network service provider may configure wireless communication devices operated by its subscribers with a preferred roaming list (PRL). The PRL typically provides a listing of visited wireless networks that the wireless communication devices may attempt to communicate with whenever suitable wireless communication service cannot be provided by the home wireless network operated by the wireless network service provider. The PRL is typically prioritized to assist a wireless communication device in selecting the most preferable visited wireless network for the wireless network operator while still meeting the service requirements of the user.

OVERVIEW

A method of operating a wireless communication device is disclosed. The method comprises storing data that associates a geographic identifier, a pseudo network signal of a first wireless communication network, and a wireless communication channel of a second wireless communication network. The method further comprises wirelessly exchanging first wireless communications with the first wireless communication network. The method further comprises entering a geographic region associated with the geographic identifier, and in response, processing the geographic identifier to identify the pseudo network signal of the first wireless communication network and the wireless communication channel of the second wireless communication network. The method further comprises wirelessly receiving the pseudo network signal from the first wireless communication network, and in response, wirelessly exchanging second wireless communications with the second wireless communication network over the wireless communication channel.

A wireless communication device comprises a processing system, a memory system, and a wireless communication transceiver. The processing system is configured to store in the memory system data that associates a geographic identifier, a pseudo network signal of a first wireless communication network, and a wireless communication channel of a second wireless communication network. The wireless communication transceiver is configured to wirelessly exchange first wireless communications with the first wireless communication network. The processing system is configured to, in response to the wireless communication device entering a geographic region associated with the geographic identifier, process the geographic identifier to identify the pseudo network signal of the first wireless communication network and the wireless communication channel of the second wireless communication network. The wireless communication transceiver is configured to wirelessly receive the pseudo network signal from the first wireless communication network, and in response, wirelessly exchange second wireless communications with the second wireless communication network over the wireless communication channel.

A wireless communication system comprises a wireless communication device and a wireless access node. The wireless communication device is configured to store data that associates a geographic identifier, a pseudo network signal of a first wireless communication network, and a wireless communication channel of a second wireless communication network. The wireless communication device is further configured to wirelessly exchange first wireless communications with the wireless access node of the first wireless communication network, and in response to the wireless communication device entering a geographic region associated with the geographic identifier, process the geographic identifier to identify the pseudo network signal of the first wireless communication network and the wireless communication channel of the second wireless communication network. The wireless access node of the first wireless communication network is configured to transmit the pseudo network signal in response to a communication loading level on the wireless access node exceeding a threshold. The wireless communication device is configured to wirelessly receive the pseudo network signal transmitted from the wireless access node of the first wireless communication network, and in response, wirelessly exchange second wireless communications with the second wireless communication network over the wireless communication channel.

BRIEF DESCRIPTION OF THE DRAWINGS

FIG. 4 is a block diagram that illustrates a preferred roaming list in an exemplary embodiment.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
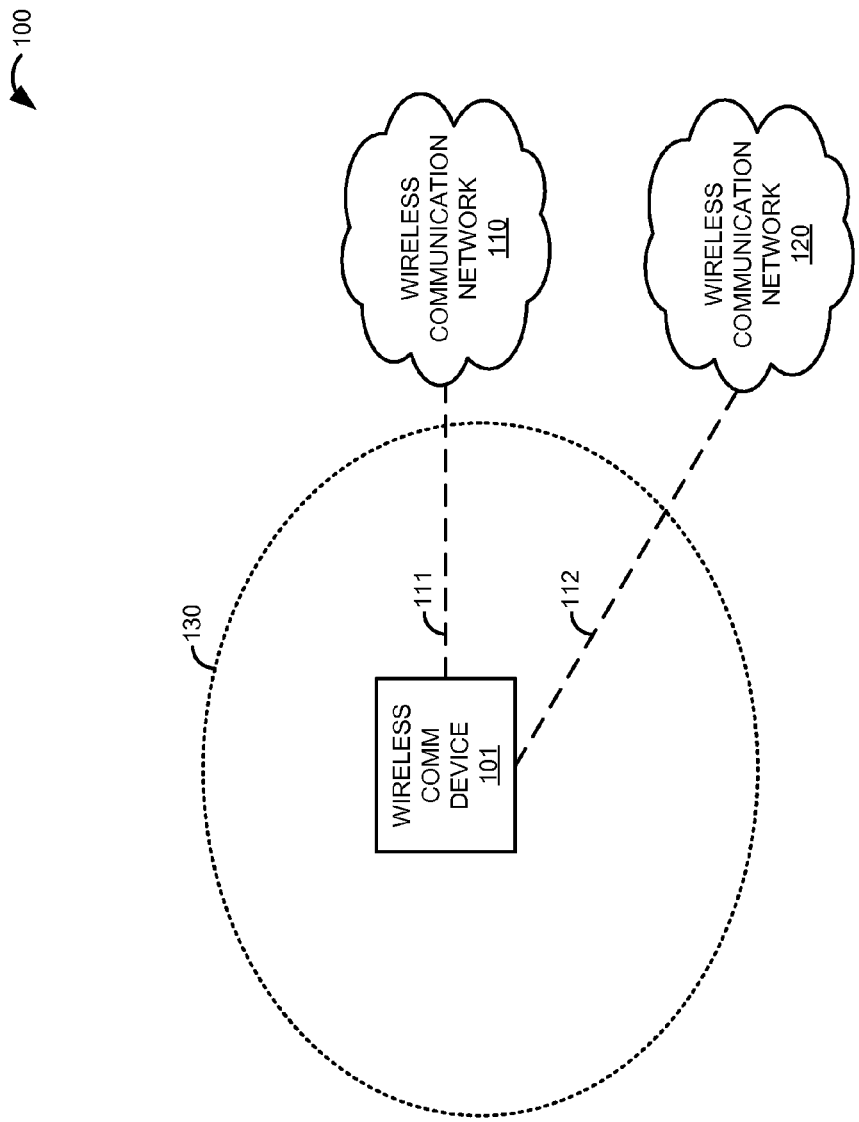
FIG. 1 is a block diagram that illustrates a communication system.

FIG. 1 is a block diagram that illustrates communication system 100. Communication system 100 includes wireless communication device 101, wireless communication network 110, and wireless communication network 120. Wireless communication device 101 and wireless communication network 110 are in communication over wireless communication link 111. Likewise, wireless communication device 101 and wireless communication network 120 communicate over wireless communication link 112. Wireless communication device 101 is located within geographic region 130, which is represented by the area within the dotted line on FIG. 1.

Figure 2:
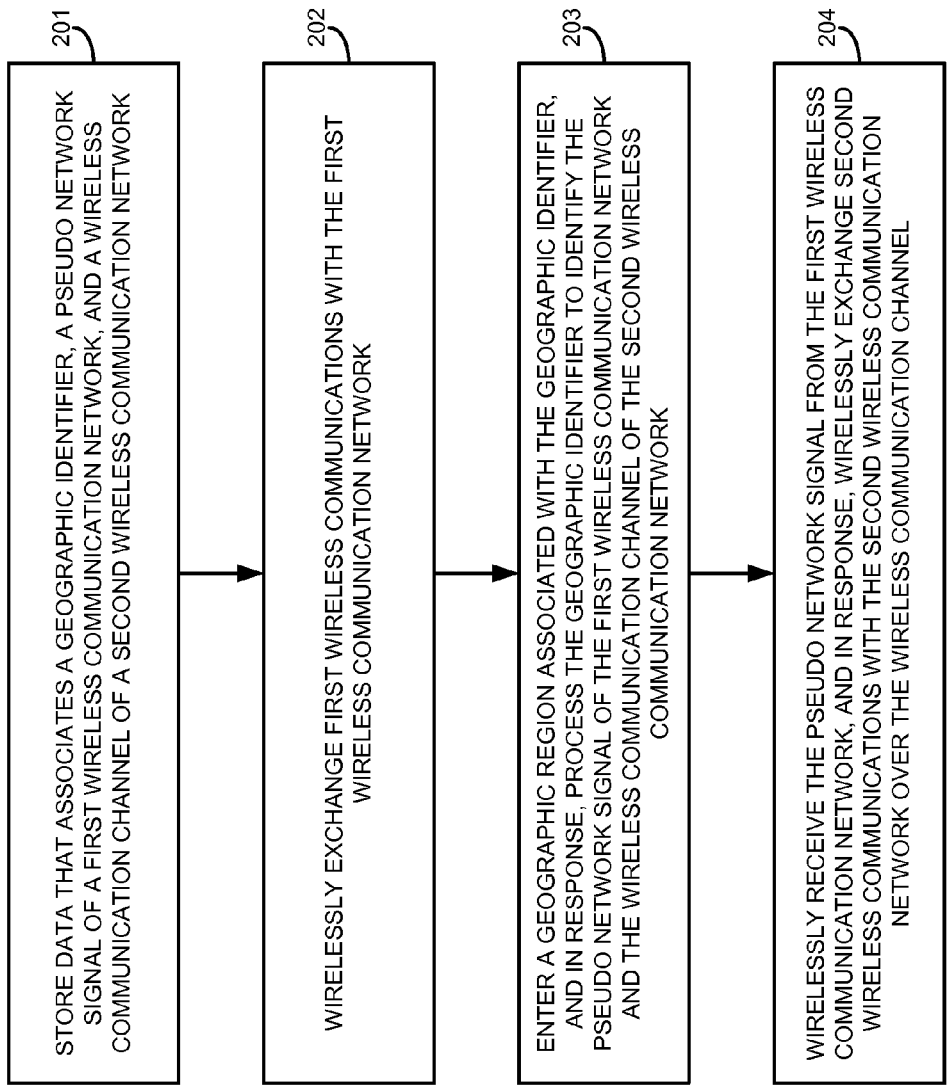
FIG. 2 is a flow diagram that illustrates an operation of the communication system.

FIG. 2 is a flow diagram that illustrates an operation of communication system 100. The steps of the operation are indicated below parenthetically. Initially, wireless communication device 101 stores data that associates a geographic identifier, a pseudo network signal of a first wireless communication network 110, and a wireless communication channel of a second wireless communication network 120 (201). Typically, wireless communication device 101 receives the data from wireless communication network 110 prior to storage. In some examples, wireless communication device 101 could store the data in a preferred roaming list that does not include system identification numbers associated with the second wireless communication network 120.

The geographic identifier included in the data typically identifies a geographic area served by a wireless communication network 110 or 120, and could comprise government-defined areas such as cities, counties, or other municipalities. In some examples, the geographic identifier could comprise any code or name that may be correlated to a network availability signal, such as the pseudo network signal included in the data stored by wireless communication device 101. The pseudo network signal could comprise a code or other information that is associated with the first wireless communication network 110 and the geographic identifier. The wireless communication channel of the second wireless communication network 120 could comprise any data that facilitates establishment of a wireless communication link 112 between wireless communication device 101 and the second wireless communication network 120. Some examples of a wireless communication channel include frequency allocations, time slot allocations, and combinations of frequencies and time slots that may be used in orthogonal frequency division multiplexing (OFDM)-based technologies.

Wireless communication device 101 wirelessly exchanges first wireless communications with the first wireless communication network 110 (202). Wireless communication device 101 typically exchanges the first wireless communications with a wireless access node of the first wireless communication network 110 in order to utilize a communication service provided by network 110. In some examples, the first wireless communication network 110 may exchange further communications with additional systems and networks on behalf of wireless communication device 101 in order to provide the communication service.

Wireless communication device 101 enters a geographic region 130 associated with the geographic identifier, and in response, processes the geographic identifier to identify the pseudo network signal of the first wireless communication network 110 and the wireless communication channel of the second wireless communication network 120 (203). Wireless communication device 101 typically determines that the geographic region 130 it has entered is associated with the geographic identifier, and processes the data that associates the geographic identifier, the pseudo network signal of the first wireless communication network 110, and the wireless communication channel of the second wireless communication network 120 to identify the pseudo network signal of the first wireless communication network 110 and the wireless communication channel of the second wireless communication network 120. In some examples, wireless communication device 101 processes the geographic identifier to identify a system identification number and a network identification number of the first wireless communication network 110 and the wireless communication channel of the second wireless communication network 120.

Wireless communication device 101 receives the pseudo network signal from the first wireless communication network 110, and in response, wirelessly exchanges second wireless communications with the second wireless communication network 120 over the wireless communication channel (204). The pseudo network signal could comprise any wireless communications transmitted from the first wireless communication network 110 that enables wireless communication device 101 to recognize the availability of the first wireless communication network 110, such as signals transmitted over broadcast control channels, paging control channels, and the like. For example, the pseudo network signal could comprise a system identification number of the first wireless communication network 110. However, because the data stored in wireless communication device 101 associates the pseudo network signal of the first wireless communication network 110 with the wireless communication channel of the second wireless communication network 120, wireless communication device 101 accesses the second wireless communication network 120 and wirelessly exchanges second wireless communications with network 120 over the wireless communication channel in response to the pseudo network signal.

In some examples, a wireless access node of the first wireless communication network 110 is configured to transmit the pseudo network signal. In such cases, the wireless access node of the first wireless communication network 110 could transmit the pseudo network signal in response to a communication loading level on the wireless access node exceeding a threshold, and/or in response to a threshold number of access failures by a plurality of wireless communication devices. Typically, the data stored in wireless communication device 101 inhibits device 101 from roaming on the second wireless communication network 120, such as by having no associations between system identification numbers of the second wireless communication network 120 and corresponding wireless communication channels of network 120. In some examples, however, the first wireless communication network 110 is configured to transmit the pseudo network signal to effectuate roaming for wireless communication device 101 on the second wireless communication network 120 over the wireless communication channel.

Wireless communication device 101 may also store additional data that associates the geographic identifier, a network availability signal of the first wireless communication network 110, and a wireless channel of the first wireless communication network 110 in some examples. In this case, a wireless access node of the first wireless communication network 110 could transmit the network availability signal associated with the wireless channel of the first wireless communication network 110, and in response to receiving the signal, wireless communication device 101 could wirelessly exchange third wireless communications with the first wireless communication network 110 over the wireless channel based on the additional data. In some examples, the wireless access node of the first wireless communication network 110 could be configured to transmit the network availability signal in response to a communication loading level on the wireless access node falling below a threshold. For example, the wireless access node could broadcast the pseudo network signal during periods of high communication loading on the wireless access node that exceed the threshold to allow roaming for wireless communication device 101 on the second wireless communication network 120, but could stop transmitting the pseudo network signal and resume broadcasting the network availability signal at times when the communication loading level on the wireless access node falls below the threshold.

Advantageously, by transmitting the pseudo network signal of the first wireless communication network 110 that is associated with the wireless communication channel of the second wireless communication network 120, wireless communication network 110 can allow wireless communication device 101 to access the second wireless communication network 120. For example, wireless communication device 101 may have no data stored therein that associates a network availability signal of the second wireless communication network 120 with a wireless communication channel of the second wireless network 120, and would thus be unable to otherwise access network 120. However, because the pseudo network signal of the first wireless communication network 110 is associated with the wireless communication channel of the second wireless communication network 120, wireless communication device 101 is able to access the second wireless communication network 120 in response to receiving the pseudo network signal from the first wireless communication network 110. In this manner, the first wireless communication network 110 can effectively control the times and conditions under which wireless communication device 101 is allowed to access the second wireless communication network 120.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1×RTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless communication networks 110 and 120.

Wireless communication networks 110 and 120 comprise core networks of different wireless communication service providers, and could include routers, gateways, telecommunication switches, servers, processing systems, or other communication equipment and systems for providing communication and data services. Wireless communication networks 110 and 120 could comprise wireless communication nodes, telephony switches, Internet routers, network gateways, computer systems, communication links, or some other type of communication equipment—including combinations thereof. Wireless communication networks 110 and 120 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Wireless communication networks 110 and 120 may be configured to communicate over metallic, wireless, or optical links—including combinations thereof. Wireless communication networks 110 and 120 may be configured to use time-division multiplexing (TDM), Internet Protocol (IP), Ethernet, optical networking, wireless protocols, communication signaling, or some other communication format—including combinations thereof. In some examples, wireless communication networks 110 and 120 include further access nodes and associated equipment for providing communication services to many wireless communication devices across a large geographic region.

Geographic region 130 comprises any designated area of land and/or water. Typically, geographic region 130 is defined by a geographic identifier. Some examples of geographic region 130 include areas defined by governmental boundaries such as a town, city, or state, base station coverage areas such as a cell or sector, areas defined by latitudes and longitudes, or any other definite geographic area.

Wireless communication links 111 and 112 use the air or space as the transport medium. Wireless communication links 111 and 112 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication links 111 and 112 may comprise many different signals sharing the same link. For example, each wireless communication link 111 and 112 could include multiple signals operating in a single propagation path comprising multiple communication sessions, frequencies, timeslots, transportation ports, logical transportation links, network sockets, IP sockets, packets, or communication directions—including combinations thereof.

Figure 3:
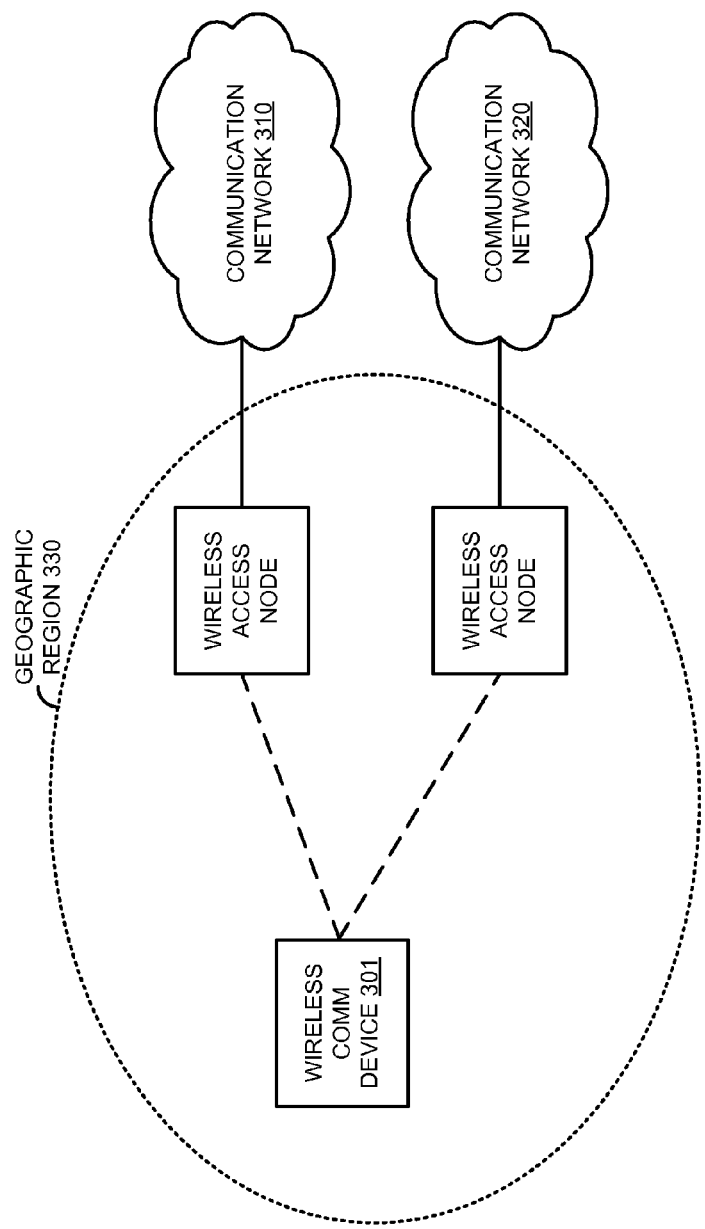
FIG. 3 is a block diagram that illustrates a communication system in an exemplary embodiment.
Figure 5:
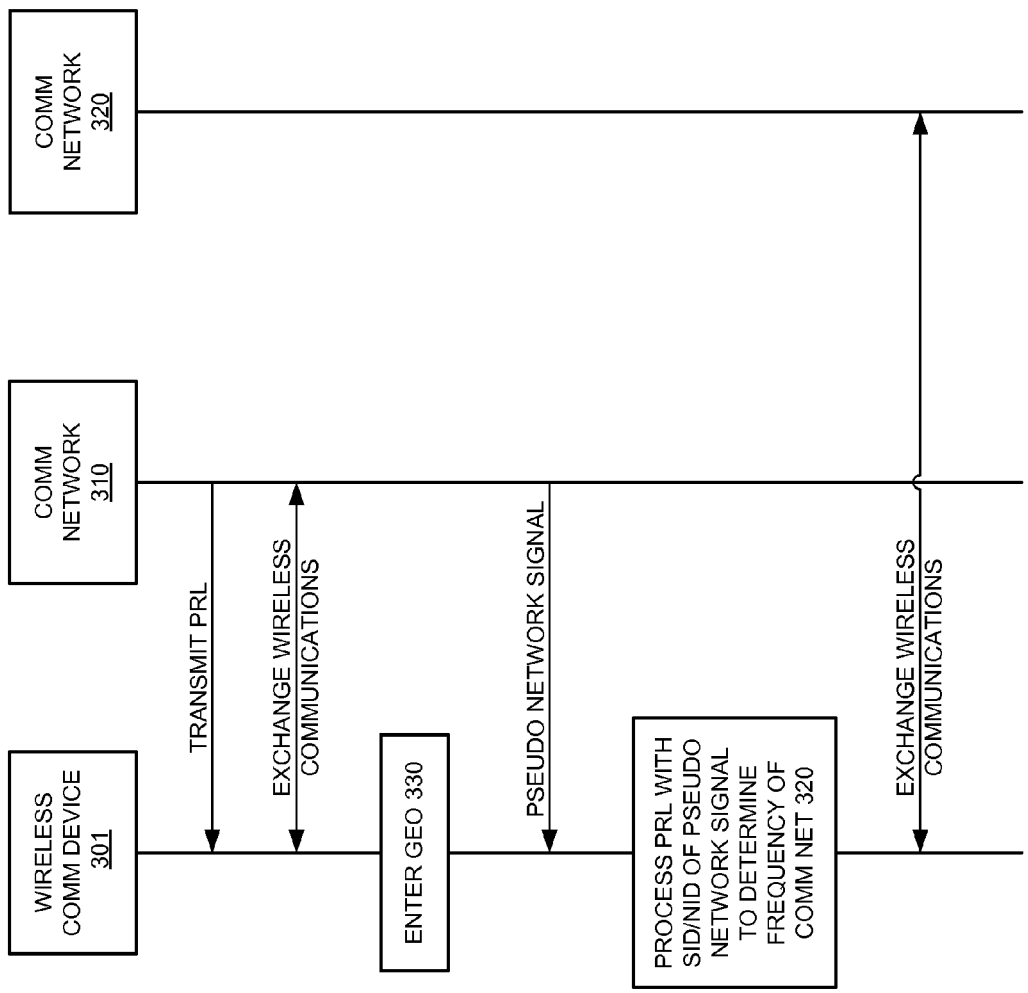
FIG. 5 is a sequence diagram that illustrates an operation of the communication system in an exemplary embodiment.

FIG. 3 is a block diagram that illustrates communication system 300 in an exemplary embodiment. Communication system 300 includes wireless communication device 301, communication networks 310 and 320, and geographic region 330. Wireless communication device 301 provides an example of wireless communication device 101, although device 101 may use alternative configurations. Likewise, communication networks 310 and 320 and their associated wireless access nodes provide examples of wireless communication networks 110 and 120, although networks 110 and 120 could use alternative configurations. In this example, wireless communication device 301 is a subscriber of communication network 310 for wireless communication services, and the wireless access node in communication with network 310 operates at a 1900 MHz frequency for EV-DO wireless communications. Communication network 320 is operated by a different communication service provider from network 310, and the wireless access node associated with network 320 operates at a 800 MHz frequency for EV-DO. Further, wireless communication device 301 has a preferred roaming list (PRL) with all EV-DO roaming channels removed, which would prevent device 301 from roaming on communication network 320. However, the following description of FIGS. 4 and 5 provides an exemplary technique for communication network 310 to temporarily enable wireless communication device 301 to roam on communication network 320 even when roaming is otherwise disabled in the PRL stored on device 301.

FIG. 4 is a block diagram that illustrates preferred roaming list 400 in an exemplary embodiment. A preferred roaming list (PRL) comprises a table or set of tables that allow a wireless communication device 301 to select a communication network 310 or 320 and acquire the appropriate wireless channel to operate on the selected network. In a CDMA network, PRLs typically comprise two functional tables: an acquisition table and a system table. An acquisition table includes an indexed list of channels or frequencies that wireless communication device 301 may use to gain access to particular communication networks 310 and 320. The information contained in each acquisition table comprises an index, the network type, and associated channel blocks. A system table includes system identification numbers (SIDs) and network identification numbers (NIDs). SIDs identify a geographic region 330 such as the area of a city or large town. NIDs are an optional subdivision of a SID.

In this example, PRL 400 is stored in wireless communication device 301. PRL 400 comprises a table with columns labeled "GEO", "SID/NID", "PROVIDER", and "FREQUENCY". The GEO field provides a geographic area associated with each SID/NID pair. In this example, the GEO field is geographic region 330 for all the SID/NID pairs shown. The first two values in the SID/NID field are 4139/21 and 4139/22. Each of these values are actual SID/NID pairs that are associated with communication network 310 as shown in the "PROVIDER" field and may be used by wireless communication device 301 to access network 310. The "FREQUENCY" column provides wireless communication channels that are associated with the SID/NID pairs. In this example, the first two SID/NID pairs of 4139/21 and 4139/22 indicate a block of available frequencies/time slots in the 1900 MHz band. Wireless communication device 301 can therefore scan the channels indicated by these 1900 MHz frequencies to operate on communication network 310.

The third SID/NID pair of 99999/65535 shown in PRL 400 is an example of a dummy or pseudo SID/NID pair. These pseudo SID/NID values are not actual system and network identification numbers assigned to communication network 310, but are used by communication network 310 to provide a wireless communication channel of communication network 320 for wireless communication device 301. Thus, although the 99999/65535 pseudo SID/NID pair appears to be associated with communication network 310 as indicated in the "PROVIDER" field, this pseudo SID/NID is actually associated with a wireless communication channel of communication network 320 in the 800 MHz frequency band. In some examples, wireless communication device 301 could be configured to translate the pseudo SID/NID values into the actual SID/NID values for communication network 320. For example, PRL 400 could have an additional column that correlates the actual SID/NID value for communication network 320 with the pseudo SID/NID value of 99999/65535 for this GEO (not shown). In another example, wireless communication device 301 could be configured to refer to a separate translation table to convert the pseudo SID/NID of 99999/65535 for the geographic region 330 GEO into the actual SID/NID for communication network 320 in that GEO. The use of the pseudo SID/NID by communication network 310 and PRL 400 by wireless communication device 301 will now be described with respect to the exemplary sequence diagram of FIG. 5.

FIG. 5 is a sequence diagram that illustrates an operation of communication system 300 in an exemplary embodiment. Initially, communication network 310 transmits PRL 400 for delivery to wireless communication device 301 via a wireless access node. In this example, wireless communication device 301 receives PRL 400 from communication network 310 when device 301 is located in a different geographic region from geographic region 330. Additional or incidental to receiving PRL 400, wireless communication device 301 and communication network 310 exchange wireless communications while device 301 is located in this different geographic region.

Wireless communication device 301 then enters geographic region 330. Upon entering geographic region 330, wireless communication device 301 processes PRL 400 with the GEO for geographic region 330 to identify the SID/NID pairs for geographic region 330 and their associated wireless communication channel frequencies. Initially, communication network 310 broadcasts a network availability signal of the 4139/21 SID/NID pair, so wireless communication device 301 selects the SID/NID of 4139/21 from PRL 400 and communicates with communication network 310 over an EV-DO channel in the 1900 MHz frequency band.

PRL 400 has no EV-DO roaming channels for geographic region 330, resulting in increased connection failures when wireless communication device 301 moves to a location within geographic region 330 that is underserved by communication network 310, or when the wireless access node of network 310 is overloaded. Because communication network 320 has communication channels in the 800 MHz band, which may travel farther and exhibit better penetration characteristics than 1900 MHz signals, these 800 MHz frequencies may provide for improved coverage in areas of geographic region 330 with many obstructions, such as trees or buildings, and may reach areas of geographic region 330 where the 1900 MHz band utilized by communication network 310 provides little to no coverage. In this example, communication network 310 identifies edge sectors of geographic region 330 where coverage is better served by the 800 MHz channels offered by communication network 320 rather than the 1900 MHz signals provided by communication network 310. When wireless communication device 301 moves to one of these edge sectors and reports access failures and/or dropped communications above a certain threshold, communication network 310 begins transmitting the pseudo network signal of SID/NID 99999/65535 to that edge sector.

The pseudo network signal of SID/NID 99999/65535 transmitted by communication network 310 is associated with an 800 MHz communication channel of communication network 320 in PRL 400. Thus, the pseudo network signal effectively activates roaming on communication network 320 for wireless communication device 301 upon receipt of the pseudo network signal from communication network 310. Wireless communication device 301 then processes PRL 400 with the 99999/65535 SID/NID pair of the pseudo network signal to determine the 800 MHz frequency band for establishing communications with communication network 320. Wireless communication device 301 then exchanges wireless communications with communication network 320 using the communication channel identified in PRL 400 for the pseudo network signal of 99999/65535. In some examples, communication network 310 could periodically assess whether performance on the 1900 MHz channels has improved in the sector based on threshold values, and if so, resume transmitting the actual SID/NID of 4139/21 for the 1900 MHz frequency channels of communication network 310 in that sector. Although not shown on PRL 400, a priority field is typically included on PRL 400 which could set the pseudo network signal entry for each GEO to the lowest priority for that GEO. By using this priority scheme, communication network 310 can ensure that wireless communication device 301 will respond to the resumed transmission of the higher priority 4139/21 SID/NID pair and switch back to the 1900 MHz communication channels provided by communication network 310.

Advantageously, communication network 310 can disable all roaming channels in PRL 400 and still temporarily enable roaming for wireless communication device 301 in specific areas where the user experience has decreased due to eliminating the 800 MHz channels in PRL 400 that are provided by communication network 320. In this manner, communication network 310 can maintain control over the duration and conditions under which wireless communication device 301 is permitted to roam, thereby reducing roaming costs to communication network 310 while still providing a good user experience for a user of wireless communication device 301.

Figure 6:
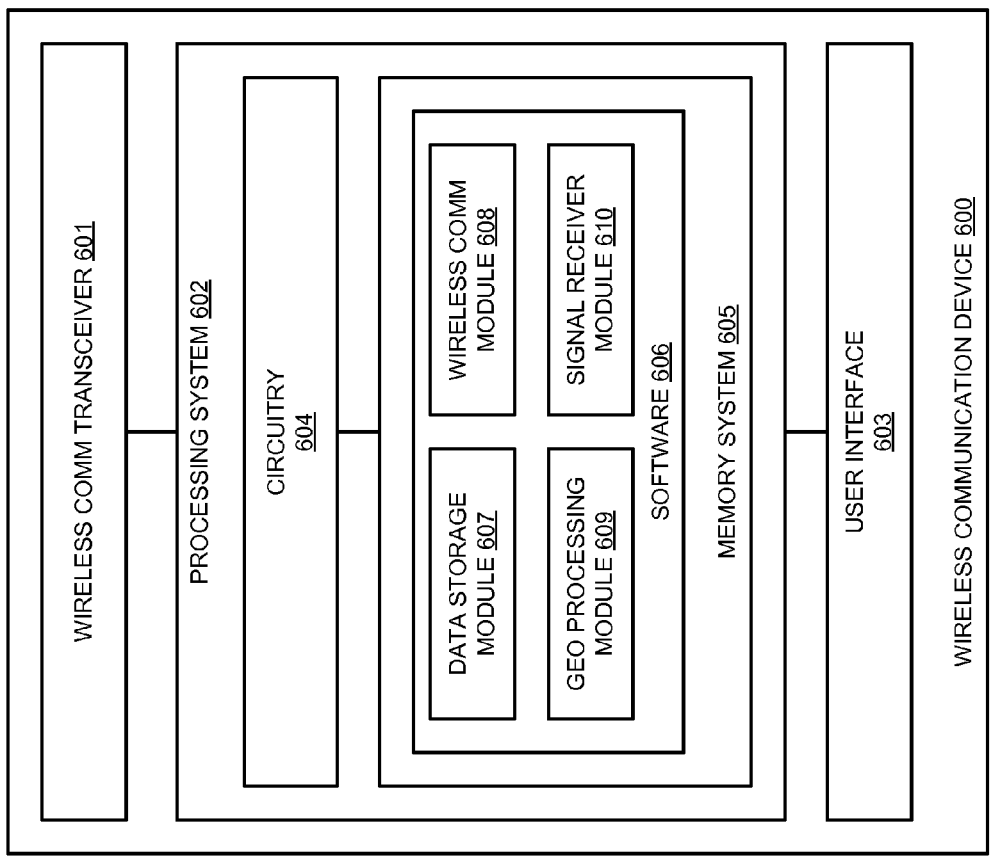
FIG. 6 is a block diagram that illustrates a wireless communication device.

FIG. 6 is a block diagram that illustrates wireless communication device 600. Wireless communication device 600 provides an example of wireless communication device 101, although device 101 could use alternative configurations. Wireless communication device 600 comprises wireless communication transceiver 601, processing system 602, and user interface 603. Processing system 602 is linked to wireless communication transceiver 601 and user interface 603. Processing system 602 includes processing circuitry 604 and memory system 605 that stores operating software 606. Operating software 606 comprises software modules 607-610. Wireless communication device 600 may include other well-known components such as a battery and enclosure that are not shown for clarity. Wireless communication device 600 may comprise a telephone, computer, e-book, mobile Internet appliance, media player, game console, wireless network interface card, or some other wireless communication apparatus—including combinations thereof.

Wireless communication transceiver 601 comprises RF communication circuitry and an antenna. The RF communication circuitry typically includes an amplifier, filter, RF modulator, and signal processing circuitry. Wireless communication transceiver 601 may also include a memory system, software, processing circuitry, or some other communication device. Wireless communication transceiver 601 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other wireless communication format. Wireless communication transceiver 601 is configured to wirelessly exchange first wireless communications with a first wireless communication network. Further, wireless communication transceiver 601 is configured to wirelessly receive a pseudo network signal from the first wireless communication network, and in response, wirelessly exchange second wireless communications with a second wireless communication network over a wireless communication channel.

User interface 603 comprises components that interact with a user to receive user inputs and to present media and/or information. User interface 603 may include a speaker, microphone, buttons, lights, display screen, touch screen, touch pad, scroll wheel, communication port, or some other user input/output apparatus—including combinations thereof. User interface 603 may be omitted in some examples.

Processing circuitry 604 comprises microprocessor and other circuitry that retrieves and executes operating software 606 from memory system 605. Processing circuitry 604 may comprise a single device or could be distributed across multiple devices—including devices in different geographic areas. Processing circuitry 604 may be embedded in various types of equipment. Memory system 605 comprises a non-transitory computer readable storage medium, such as a disk drive, flash drive, data storage circuitry, or some other hardware memory apparatus. Memory system 605 may comprise a single device or could be distributed across multiple devices—including devices in different geographic areas. Memory system 605 may be embedded in various types of equipment. Processing circuitry 604 is typically mounted on a circuit board that may also hold memory system 605 and portions of wireless communication transceiver 601 and user interface 603. Operating software 606 comprises computer programs, firmware, or some other form of machine-readable processing instructions. Operating software 606 may include an operating system, utilities, drivers, network interfaces, applications, or some other type of software. In this example, operating software 606 comprises software modules 607-610, although software 606 could have alternative configurations in other examples.

When executed by processing circuitry 604, operating software 606 directs processing system 602 to operate wireless communication device 600 as described herein for wireless communication device 101. In particular, operating software 606 directs processing system 602 to store in memory system 605 data that associates a geographic identifier, a pseudo network signal of a first wireless communication network, and a wireless communication channel of a second wireless communication network. In addition, operating software 606 directs processing system 602 to direct wireless communication transceiver 601 to wirelessly exchange first wireless communications with the first wireless communication network. Further, operating software 606 directs processing system 602 to process the geographic identifier to identify the pseudo network signal of the first wireless communication network and the wireless communication channel of the second wireless communication network in response to the wireless communication device entering a geographic region associated with the geographic identifier. Finally, operating software 606 directs processing system 602 to direct wireless communication transceiver 601 to wirelessly receive the pseudo network signal from the first wireless communication network, and in response, wirelessly exchange second wireless communications with the second wireless communication network over the wireless communication channel.

In this example, operating software 606 comprises a data storage software module 607 that stores in memory system 605 data that associates a geographic identifier, a pseudo network signal of a first wireless communication network, and a wireless communication channel of a second wireless communication network. Additionally, operating software 606 comprises a wireless communications software module 608 that exchanges first wireless communications with the first wireless communication network. Operating software 606 also comprises a geo processing software module 609 that processes the geographic identifier to identify the pseudo network signal of the first wireless communication network and the wireless communication channel of the second wireless communication network in response to the wireless communication device entering a geographic region associated with the geographic identifier. Finally, operating software 606 comprises a signal receiver software module 610 that wirelessly receives the pseudo network signal from the first wireless communication network, and in response, wirelessly exchanges second wireless communications with the second wireless communication network over the wireless communication channel.

Figure 7:
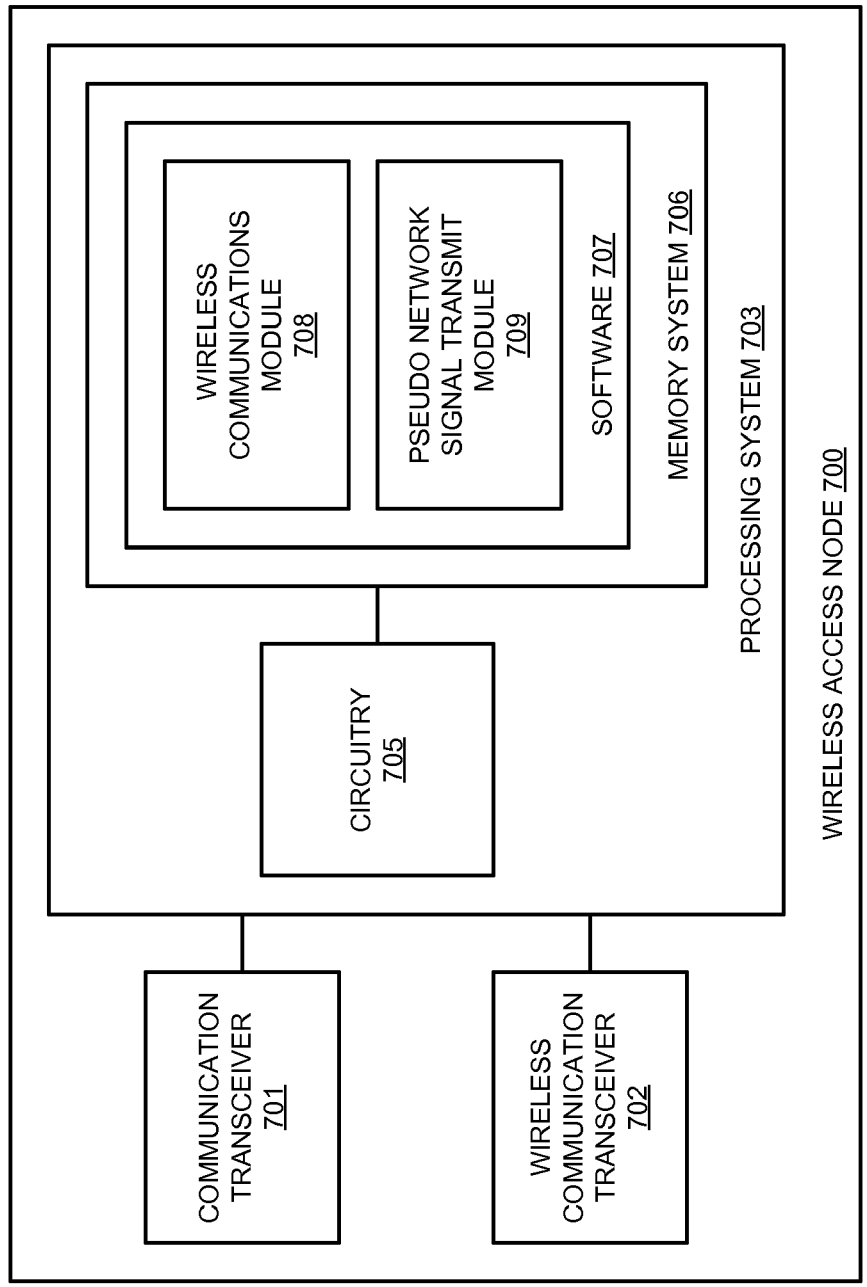
FIG. 7 is a block diagram that illustrates a wireless access node.

FIG. 7 is a block diagram that illustrates wireless access node 700. Wireless access node 700 provides an example of a wireless access node that may be utilized by wireless communication network 110, although network 110 may use equipment with alternative configurations. Wireless access node 700 comprises communication transceiver 701, wireless communication transceiver 702, and processing system 703. Processing system 703 is linked to communication transceiver 701 and wireless communication transceiver 702. Processing system 703 includes processing circuitry 705 and memory system 706 that stores operating software 707. Operating software 707 comprises software modules 708 and 709.

Communication transceiver 701 comprises components that communicate over communication links, such as network cards, ports, RF transceivers, processing circuitry and software, or some other communication components. Communication transceiver 701 may be configured to communicate over metallic, wireless, or optical links. Communication transceiver 701 may be configured to use TDM, IP, Ethernet, optical networking, wireless protocols, communication signaling, or some other communication format—including combinations thereof.

Wireless communication transceiver 702 comprises RF communication circuitry and an antenna. The RF communication circuitry typically includes an amplifier, filter, RF modulator, and signal processing circuitry. Wireless communication transceiver 702 may also include a memory system, software, processing circuitry, or some other communication device. Wireless communication transceiver 702 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 702 may be configured to exchange first wireless communications with a wireless communication device and transmit a pseudo network signal to the wireless communication device. In some examples, wireless communication transceiver 702 may be configured to transmit the pseudo network signal in response to a communication loading level on wireless access node 700 exceeding a threshold, and/or in response to a threshold number of access failures by a plurality of wireless communication devices.

Processing circuitry 705 comprises microprocessor and other circuitry that retrieves and executes operating software 707 from memory system 706. Processing circuitry 705 may comprise a single device or could be distributed across multiple devices—including devices in different geographic areas. Processing circuitry 705 may be embedded in various types of equipment. Memory system 706 comprises a non-transitory computer readable storage medium, such as a disk drive, flash drive, data storage circuitry, or some other hardware memory apparatus. Memory system 706 may comprise a single device or could be distributed across multiple devices—including devices in different geographic areas. Memory system 706 may be embedded in various types of equipment. Operating software 707 comprises computer programs, firmware, or some other form of machine-readable processing instructions. Operating software 707 may include an operating system, utilities, drivers, network interfaces, applications, or some other type of software. In this example, operating software 707 comprises software modules 708 and 709, although software 707 could have alternative configurations in other examples.

When executed by circuitry 705, operating software 707 directs processing system 703 to operate as described herein. In particular, operating software 707 may direct processing system 703 to direct wireless communication transceiver 702 to exchange first wireless communications with a wireless communication device. Additionally, operating software 707 may direct processing system 703 to direct wireless communication transceiver 702 to transmit a pseudo network signal to the wireless communication device.

In this example, operating software 707 comprises a wireless communications software module 708 that exchanges first wireless communications with a wireless communication device. Further, operating software 707 comprises a pseudo network signal transmit software module 709 that transmits a pseudo network signal to the wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, the method comprising:
   storing data that associates a geographic identifier, a pseudo network signal of a first wireless communication network, and a wireless communication channel of a second wireless communication network;
   wirelessly exchanging first wireless communications with the first wireless communication network;
   entering a geographic region associated with the geographic identifier, and in response, processing the geographic identifier to identify the pseudo network signal of the first wireless communication network and the wireless communication channel of the second wireless communication network; and
   wirelessly receiving the pseudo network signal from the first wireless communication network, and in response, wirelessly exchanging second wireless communications with the second wireless communication network over the wireless communication channel.

2. The method of claim 1 wherein a wireless access node of the first wireless communication network is configured to transmit the pseudo network signal in response to a communication loading level on the wireless access node exceeding a threshold.

3. The method of claim 1 wherein a wireless access node of the first wireless communication network is configured to transmit the pseudo network signal in response to a threshold number of access failures by a plurality of wireless communication devices.

4. The method of claim 1 wherein the first wireless communication network is configured to transmit the pseudo network signal to effectuate roaming for the wireless communication device on the second wireless communication network over the wireless communication channel.

5. The method of claim 1 further comprising storing additional data that associates the geographic identifier, a network availability signal of the first wireless communication network, and a wireless channel of the first wireless communication network, and wirelessly receiving the network availability signal transmitted from a wireless access node of the first wireless communication network, and in response, wirelessly exchanging third wireless communications with the first wireless communication network over the wireless channel based on the additional data.

6. The method of claim 5 wherein the wireless access node is configured to transmit the network availability signal in response to a communication loading level on the wireless access node falling below a threshold.

7. The method of claim 1 wherein processing the geographic identifier to identify the pseudo network signal of the first wireless communication network and the wireless communication channel of the second wireless communication network comprises processing the geographic identifier to identify a system identification number and a network identification number of the first wireless communication network and the wireless communication channel of the second wireless communication network.

8. The method of claim 1 wherein storing the data that associates the geographic identifier, the pseudo network signal of the first wireless communication network, and the wireless communication channel of the second wireless communication network comprises storing the data in a preferred roaming list.

9. The method of claim 8 wherein the preferred roaming list does not include system identification numbers associated with the second wireless communication network.

10. The method of claim 1 wherein the pseudo network signal comprises a system identification number of the first wireless communication network.

11. A wireless communication device comprising:
a processing system configured to store in a memory system data that associates a geographic identifier, a pseudo network signal of a first wireless communication network, and a wireless communication channel of a second wireless communication network;
a wireless communication transceiver configured to wirelessly exchange first wireless communications with the first wireless communication network;
the processing system configured to, in response to the wireless communication device entering a geographic region associated with the geographic identifier, process the geographic identifier to identify the pseudo network signal of the first wireless communication network and the wireless communication channel of the second wireless communication network; and
the wireless communication transceiver configured to wirelessly receive the pseudo network signal from the first wireless communication network, and in response, wirelessly exchange second wireless communications with the second wireless communication network over the wireless communication channel.

12. The wireless communication device of claim 11 wherein a wireless access node of the first wireless communication network is configured to transmit the pseudo network signal in response to a communication loading level on the wireless access node exceeding a threshold.

13. The wireless communication device of claim 11 wherein a wireless access node of the first wireless communication network is configured to transmit the pseudo network signal in response to a threshold number of access failures by a plurality of wireless communication devices.

14. The wireless communication device of claim 11 wherein the first wireless communication network is configured to transmit the pseudo network signal to effectuate roaming for the wireless communication device on the second wireless communication network over the wireless communication channel.

15. The wireless communication device of claim 11 further comprising the processing system configured to store in the memory system additional data that associates the geographic identifier, a network availability signal of the first wireless communication network, and a wireless channel of the first wireless communication network, and the wireless communication transceiver configured to wirelessly receive the network availability signal transmitted from a wireless access node of the first wireless communication network, and in response, wirelessly exchange third wireless communications with the first wireless communication network over the wireless channel based on the additional data.

16. The wireless communication device of claim 15 wherein the wireless access node is configured to transmit the network availability signal in response to a communication loading level on the wireless access node falling below a threshold.

17. The wireless communication device of claim 11 wherein the processing system configured to process the geographic identifier to identify the pseudo network signal of the first wireless communication network and the wireless communication channel of the second wireless communication network comprises the processing system configured to process the geographic identifier to identify a system identification number and a network identification number of the first wireless communication network and the wireless communication channel of the second wireless communication network.

18. The wireless communication device of claim 11 wherein the processing system configured to store in the memory system the data that associates the geographic identifier, the pseudo network signal of the first wireless communication network, and the wireless communication channel of the second wireless communication network comprises the processing system configured to store the data in a preferred roaming list in the memory system.

19. The wireless communication device of claim 18 wherein the preferred roaming list does not include system identification numbers associated with the second wireless communication network.

20. A wireless communication system comprising:
a wireless communication device configured to store data that associates a geographic identifier, a pseudo network signal of a first wireless communication network, and a wireless communication channel of a second wireless communication network;
the wireless communication device configured to wirelessly exchange first wireless communications with a wireless access node of the first wireless communication network, and in response to the wireless communication device entering a geographic region associated with the geographic identifier, process the geographic identifier to identify the pseudo network signal of the first wireless communication network and the wireless communication channel of the second wireless communication network;
the wireless access node of the first wireless communication network configured to transmit the pseudo network signal in response to a communication loading level on the wireless access node exceeding a threshold; and
the wireless communication device configured to wirelessly receive the pseudo network signal transmitted from the wireless access node of the first wireless communication network, and in response, wirelessly exchange second wireless communications with the second wireless communication network over the wireless communication channel.

* * * * *